Nov. 24, 1953 A. H. HAWES 2,660,415
PROCESS AND APPARATUS FOR COATING SURFACES WITH LIQUID
COMPOSITIONS CONTAINING SOLID MATTER IN SUSPENSION
Filed April 15, 1952 5 Sheets-Sheet 4
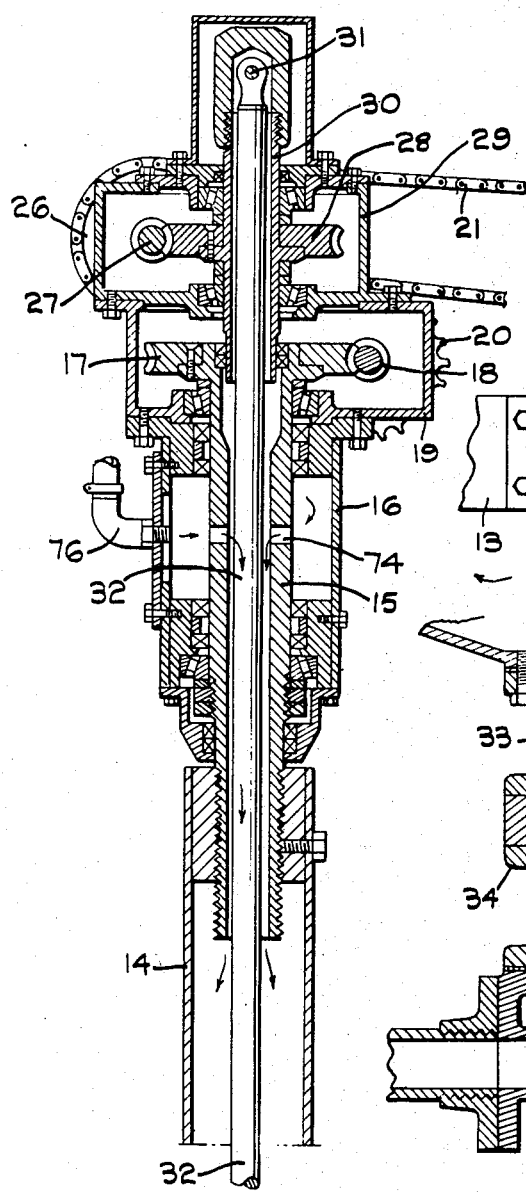
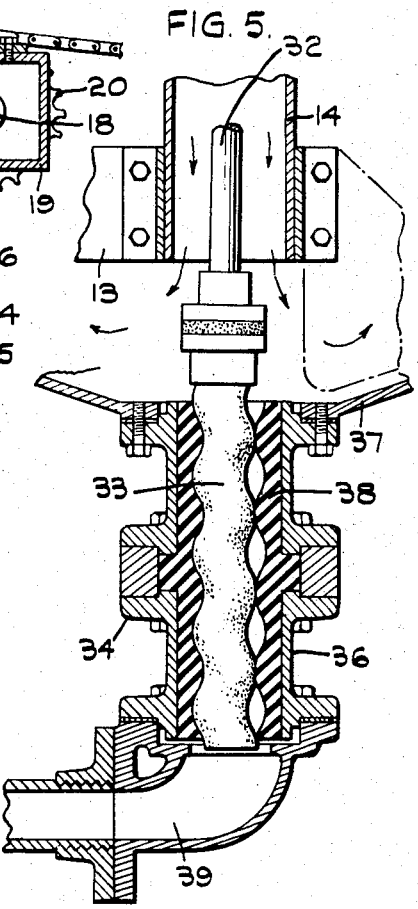
INVENTOR
Albert Henry Hawes
BY
Richardson, Davis and Norton
his AGENTS

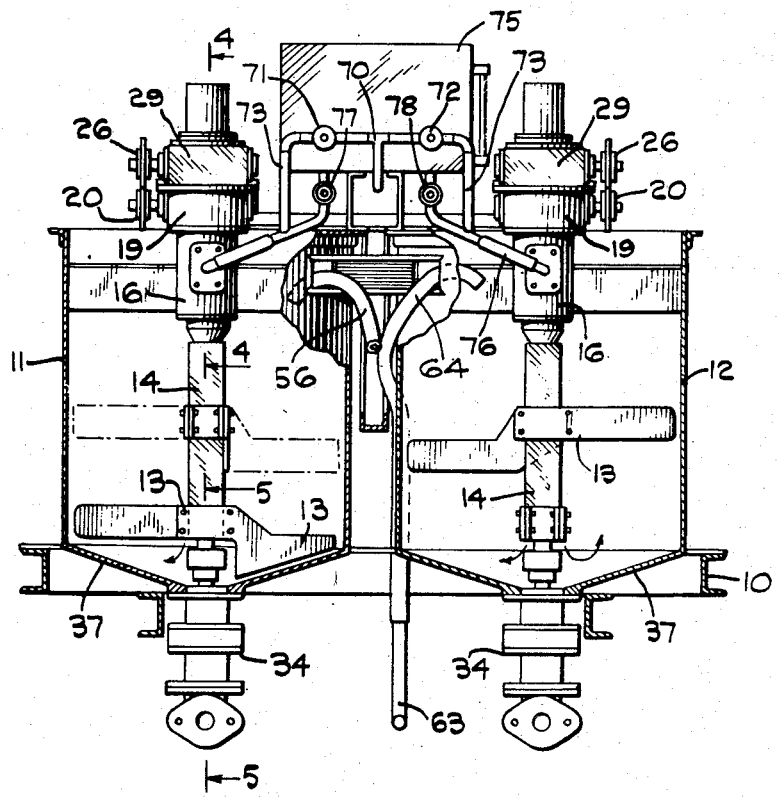

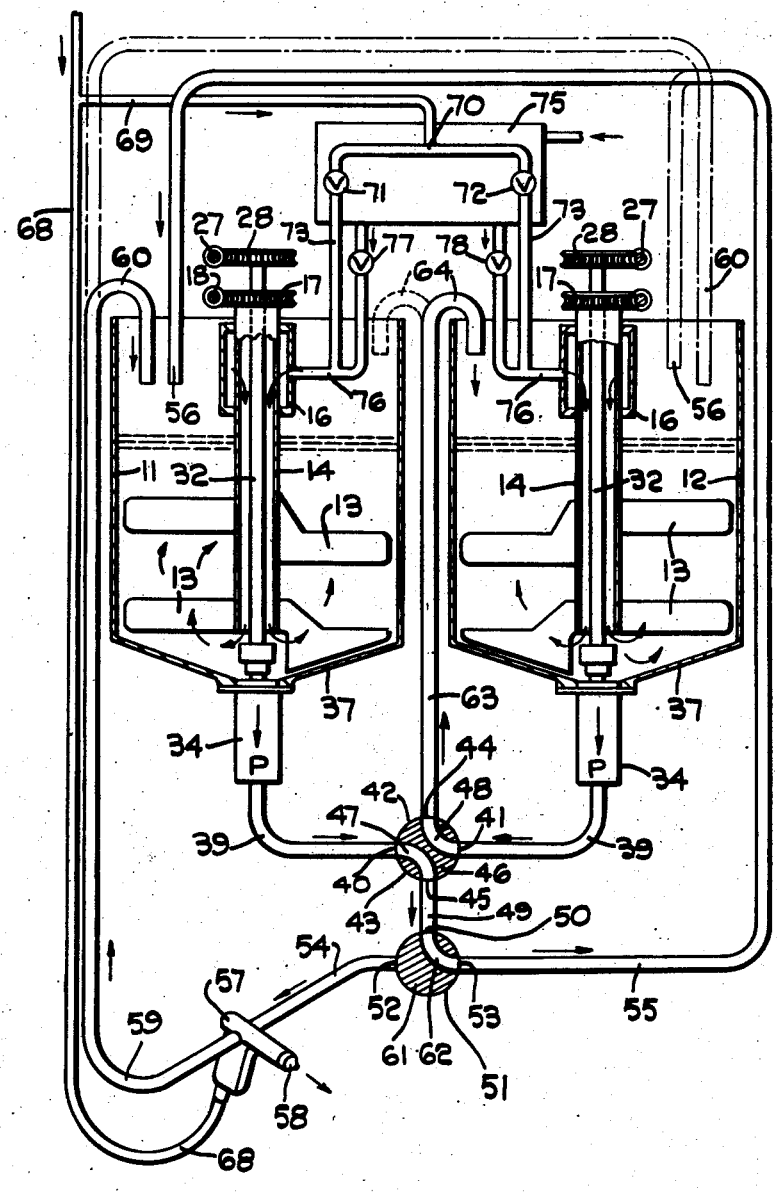

Patented Nov. 24, 1953

2,660,415

UNITED STATES PATENT OFFICE 2,660,415

PROCESS AND APPARATUS FOR COATING SURFACES WITH LIQUID COMPOSITIONS CONTAINING SOLID MATTER IN SUSPENSION

Albert Henry Hawes, Erdington, Birmingham, England, assignor to Kwikform Limited, Birmingham, England, a British company Application April 15, 1952, Serial No. 282,354

Claims priority, application Great Britain April 27, 1951

9 Claims. (Cl. 259—161)

This invention relates to a new or improved process and apparatus for coating surfaces with liquid compositions containing solid matter in suspension, the invention being particularly applicable to the coating of walls and other surfaces with cement, plaster and similar material which is applied in suspension in water, although the invention is capable of being applied to other compositions consisting of solid matter in suspension in a liquid vehicle.

In applying such compositions by any continuous or semi-continuous coating process, difficulties arise by reason of the fact that the solid constituents tend to separate out from the liquid vehicle and form solid or semi-solid deposits which soon clog certain parts of the apparatus and prevent it from properly functioning.

In the specification of my prior United States application Ser. No. 9744 filed February 20, 1948, now Patent No. 2,596,074, granted May 6, 1952, I have described one form of process and apparatus which I developed with a view to overcoming this difficulty, such process involving essentially the circulation of the composition to be applied around a closed circuit constituting a feeding circuit from which the composition was discharged directly on to the wall or other surface to be coated.

In the apparatus as described in my foregoing specification, I provide only a single reservoir or container for the composition in series with the feeding circuit, and although in said patent I have described the provision of a preliminary mixing vessel from which freshly mixed composition can be fed from time to time into the composition container, it is difficult with the apparatus as described in the foregoing specification to operate the apparatus continuously for an unduly prolonged period, without a certain settlement of the material occurring in the bottom of the single container which is arranged in series with the feeding circuit.

This difficulty arises from the fact that although in my aforesaid apparatus I provide a mixing circuit around which a proportion of the composition can be continuously circulated through the container while the remainder is circulated around the feeding circuit, if too great a proportion of the mixture is fed around the mixing circuit simultaneously with circulation around the feeding circuit from the one pump provided in the apparatus aforesaid, an insufficient quantity of mixture may be fed to the spray gun from which the composition is discharged on to the surface to be coated.

The present invention seeks to provide an improved process and apparatus which is capable of being used satisfactorily and continuously for much longer periods than is possible with the apparatus described in either of my specifications aforesaid.

According to the present invention, I provide a process for coating surfaces with compositions of the kind hereinbefore specified, comprising the steps of mixing together successive batches of the composition to be coated, circulating each batch in turn around a closed circuit constituting a feeding circuit, discharging the composition directly from said feeding circuit on to the surface to be coated, and simultaneously with the circulation of one batch around said feeding circuit, mixing the next successive batch and circulating the same continuously around a further circuit constituting a mixing circuit, so as to maintain the solid constituents of such batch mixture in suspension in the liquid vehicle until the same is required to be supplied to said feeding circuit on the utilisation of the batch, or a predetermined proportion thereof, which has previously been mixed.

The invention further comprises apparatus comprising a pair of mixing containers for the composition to be applied, means for effecting mixture of the constituents of said composition within each of said containers, fluid circulating means operably connected to each of said containers and so arranged as to be capable of circulating the composition around either of two mixing circuits of which the associated container forms a part, a feeding circuit, means for discharging composition from said feeding circuit directly on to the surface to be coated and means for effecting circulation of the mixture from one or the other of said two containers continuously around said feeding circuit, the arrangement being such that the fully mixed composition from one container can be circulated around the feeding circuit and discharged therefrom, while simultaneously, further composition can be mixed in the other container and circulated continuously around the associated mixing circuit, so as to maintain the solid constituents thereof in suspension in the liquid vehicle right up to the time at which it is required to supply the same to the feeding circuit.

The invention is illustrated in the accompanying drawings wherein:

Figure 3 is a sectional view on the line 3—3 of Figure 1.

Figure 1:
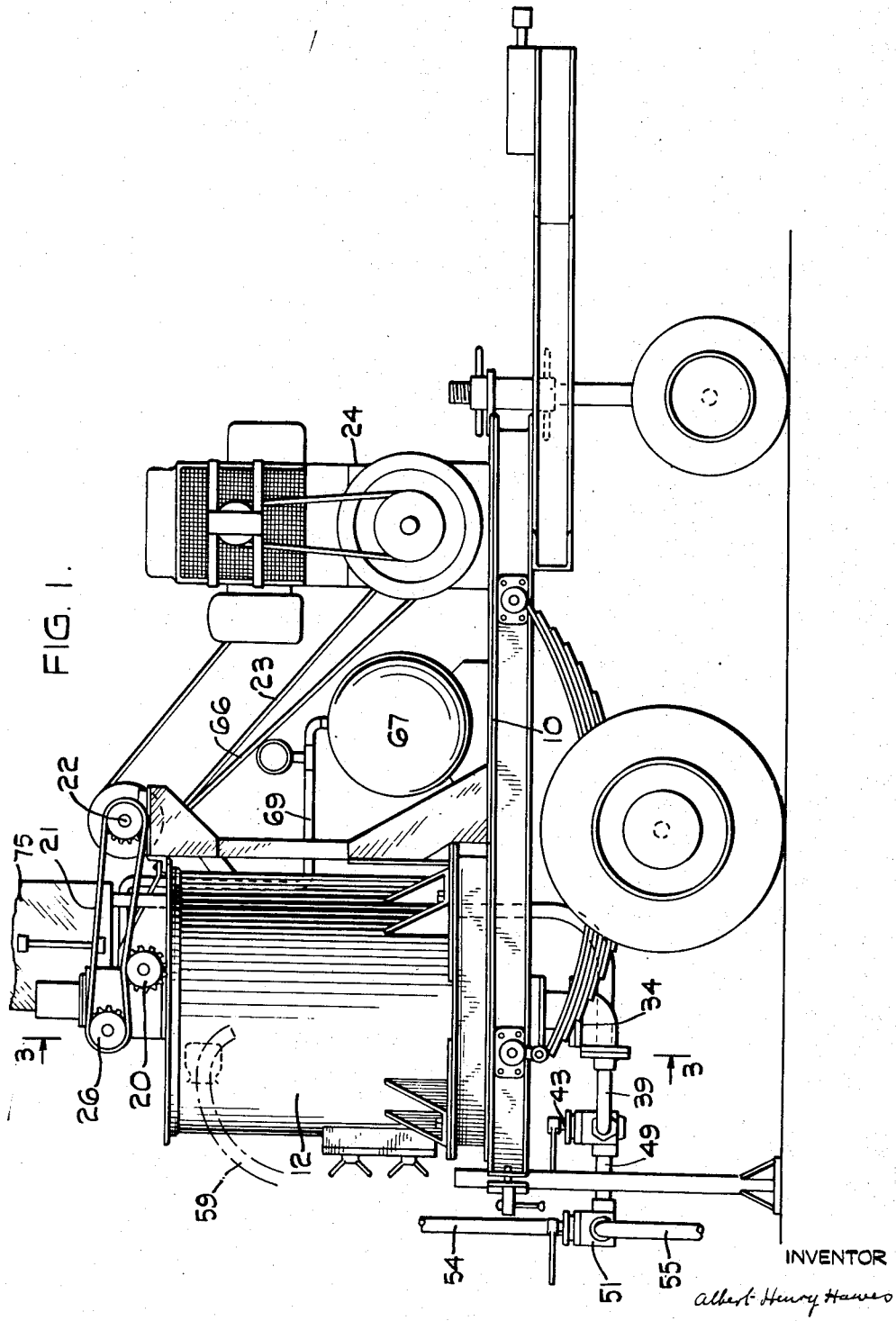
Figure 1 is a side elevation of one form of coating apparatus embodying the present invention.
Figure 2:
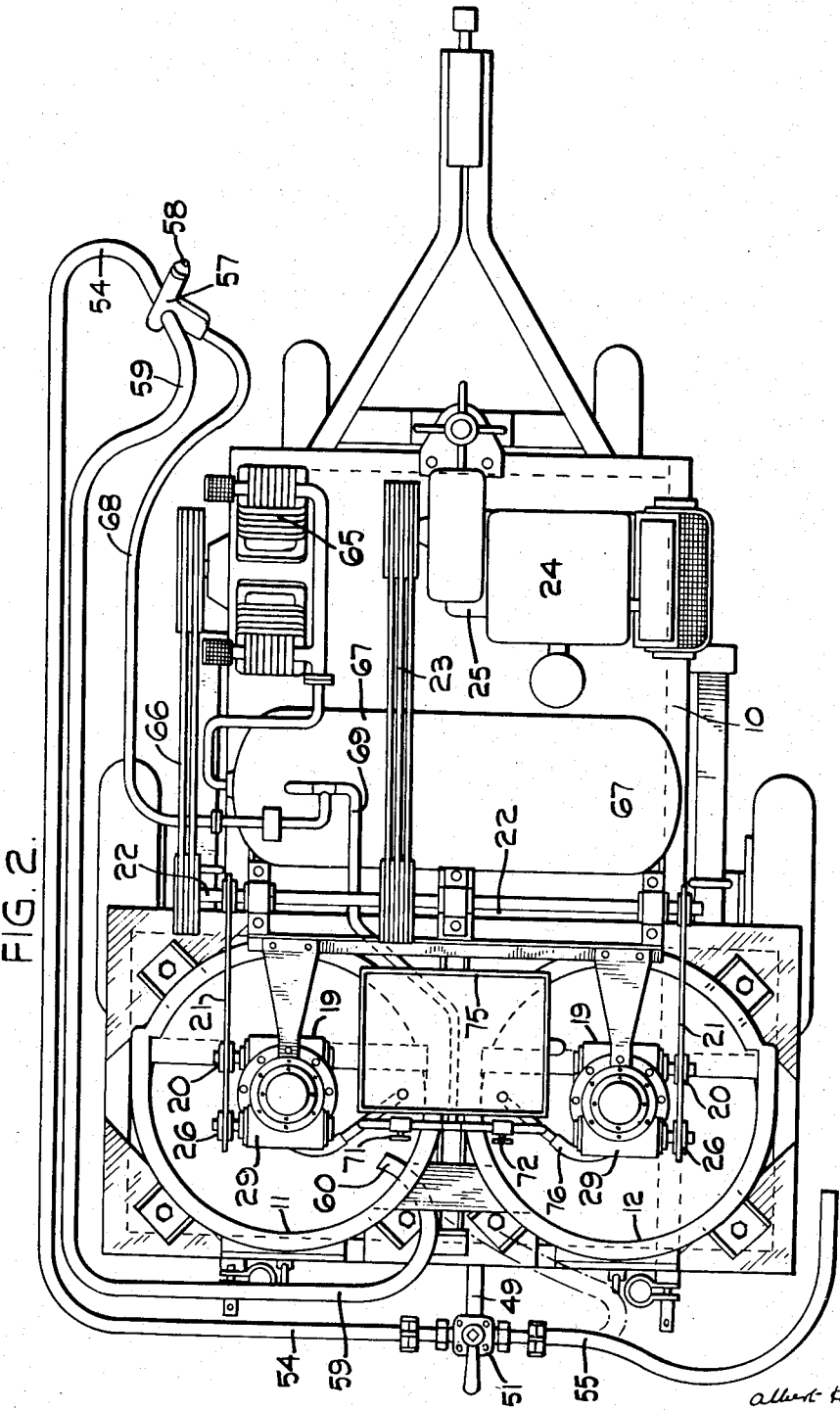
Figure 2 is a plan view of the apparatus depicted in Figure 1.

Figures 4 and 5 are sectional views to an enlarged scale on the lines 4—4 and 5—5 respectively of Figure 3.

Figure 6 is a diagrammatic part sectional view of the same apparatus illustrating the layout of the various circuits and the associated valves.

In the construction illustrated the apparatus comprises a wheeled platform 10 on one end of which is mounted a pair of containers 11, 12 for the composition, namely cement, plaster, or similar material, which is to be applied to a wall or other suitable surface.

These two containers as shown are of cylindrical form disposed in side by side relationship with their axes vertical, and each having mounted therein an agitator or other mixing device 13 in the form of a number of sets of paddles spaced apart vertically and mounted upon a vertically extending tubular driving shaft 14 supported for rotation about the central axis of the corresponding cylindrical container.

As shown more particularly in Figure 4 each tubular shaft 14 is connected at its upper end to a short coaxial hollow spindle 15 supported rotatably in bearings from an outer stationary casing 16, the hollow spindle 15 at its upper end carrying a wormwheel 17 driven by worm 18 both enclosed within an outer casing 19 the worm 18 being mounted on a short shaft which projects to one side of the casing 19 and carries a sprocket wheel 20 driven by driving chain 21, the two driving chains 21 associated one with each container 11, 12 being driven from a common horizontal intermediate shaft 22 through a belt drive 23 from a power unit 24 such as an internal combustion engine. The drive from the power unit is taken through a gear box and clutch indicated generally at 25 whereby the drive to each of the two chains 21 may be interrupted when desired.

Each driving chain 21 further drives a sprocket wheel 26 which is mounted on the end of a short shaft which carries a worm 27, which worm engages with wormwheel 28 arranged within a casing 29 disposed immediately above the casing 19 aforesaid, and the wormwheel 28 is mounted on the lower end of a short hollow sleeve 30 within the casing 29; the sleeve at its upper end having an overload clutch connection 31 to the upper end of a vertical pump driving shaft 32 disposed concentrically within the corresponding tubular driving shaft 14, and as shown most clearly in Figure 5 the lower end of each pump driving shaft 32 extends below the lower end of the associated tubular driving shaft 14 and is connected to the rotor 33 of a composition circulating pump 34 of a form similar to the pump described in my patent aforesaid, but having the rotor 33 arranged for rotation about a vertical axis.

Each pump is disposed within a tubular housing 36 mounted on the downwardly dished base 37 of each container 11, 12 and extending within an opening formed centrally in such base.

Mounted within each pump housing is a stator 38 as described in the prior specification aforesaid, and the upper and lower ends of each pump stator 38 constitute pump inlet and pump discharge ports respectively, which inlet and discharge ports communicate respectively with the interior of the associated container and with a dependent discharge pipe 39. Each discharge pipe 39 is connected to a pair of high pressure inlet ports 40, 41 provided on diametrically opposite sides of the hollow cylindrical seating 42 of a 4-way rotary valve 43, which seating is provided on the remaining two opposite sides thereof with a mixing circuit port 44 and a feeding circuit port 45, making four ports in all as shown in Figure 6.

The rotatable valve member 46 of this 4-way valve is provided with a pair of transfer ports 47, 48 adapted in one or the other of two operative positions of this valve, to place one or the other of the inlet ports 40, 41 in communication one with the mixing circuit port 44, and the other with the feeding circuit port 45, so that according to the position of the valve, one or the other of the containers 11, 12 will be connected to either the mixing circuit port 44 or the feeding circuit port 45.

The feeding circuit port 45 of the 4-way valve 43 is connected by an intermediate pipe 49 to the inlet port 50 of a 3-way valve 51 the other two ports 52 and 53 of which are connected respectively to one end of a flexible hose 54 forming part of the feeding circuit, and the other port namely the port 53 is connected to one end of a flexible circulating hose 55, the other end 56 of which is adapted to be inserted in the top of one or the other of the two containers 11, 12 at the will of the operator.

The flexible hose 54 which forms part of the feeding circuit forms a supply line to a spray gun 57, which spray gun preferably is of the particular form described in my patent aforesaid, the arrangement being such that as described in such specification the mixture which is being circulated around the feeding circuit passes through the interior of the gun, from which a proportion thereof is discharged through the gun nozzle 58 on to the surface to be coated, the remainder of the mixture passing along the return flexible hose 59 which extends from the gun to the two containers, the arrangement being such that the end 60 of this return hose can be directed into one or the other of the two containers 11, 12 as desired.

The rotatable valve member 61 of this 3-way valve is provided with a single transfer port 62 adapted in one or the other of the two operative positions of this 3-way valve to place its inlet port 50 in communication either as shown with the hose 55 or with the hose 54 leading to the spray gun 57. The mixing circuit port 44 of the 4-way valve 43 is connected to one end of a mixing circuit flexible hose 63, the opposite end 64 of which is adapted to be directed in to one or the other of the two containers 11, 12 as desired by the operator; and the arrangement is such that in the one position of the 4-way valve 43 as shown in Figure 6 mixture may be fed from the container 11 by its associated pump 34 through ports 40 and 45 of this 4-way valve to the inlet port 50 of the 3-way valve 51, and simultaneously mixture is circulated from the container 12 by its associated pump through the inlet port 41 and mixing circuit port 44 of the 4-way valve through hose 63 back to this container 12 so that the material in the latter is merely circulated continuously around a mixing circuit.

With the 4-way valve 43 in position, for example as shown in Figure 6, then according to the position of the 3-way valve 51, the mixture fed from container 11 can either itself be circulated around a second mixing circuit formed by 3-way valve ports 50, 53 and hose 55 back to the container 11 or on turning the 3-way valve back to the container 11 or on turning the 3-way valve from the position shown in Figure 6, such mixture from container 11 may be fed to spray gun 57, the surplus mixture being returned by hose 59 back to container 11.

By rotating the 4-way valve 43 into its other position the container 12 is connected to the 3-way valve 51 and the container 11 is connected to the mixing circuit hose 63, the end 64 of which would then be directed into the mouth of the container 11 instead of as shown into the container 12. In this position of the 4-way valve the material from the container 12 may similarly according to the position of the 3-way valve be fed to the spray gun, the surplus mixture therefrom being directed by hose 59 into the mouth of the container 12, or, alternatively passed around the second mixing circuit provided by the hose 55, the end 56 of which would then be directed into the mouth of the container 12.

Thus the material in both containers 11, 12 may be circulated simultaneously around two entirely separate and independent mixing circuits; or the material from either container may be fed around the feeding circuit containing the spray gun, while the material from the other container still continues to circulate around one of the aforesaid mixing circuits.

The platform 10 has mounted thereon an air compressor 65 driven through belt 66 from the intermediate shaft aforesaid 22 and from the receiver 67 of this air compressor, a flexible hose connection 68 is provided for supplying compressed air to the spray gun 57 as described in my patent aforesaid.

From the receiver 67 a second pipe connection 69 is taken which as shown most clearly in Figures 3, 4 and 6 bifurcates at 70 and leads to two aeration control valves 71, 73 associated respectively one with each container 11, 12 which control valves are connected through pipes 73 to the interior of one of the two casings 16 aforesaid; the air under pressure therefrom passing through radial holes 74 in hollow spindle 15 to the interior of the latter and thus to the interior of the corresponding tubular agitator driving shaft 14.

As shown most clearly in Figure 5 the lower end of this shaft is spaced an appreciable distance above the base 37 of the container 11, 12 thus permitting of the air thereby fed under pressure to the interior of each shaft 14 passing freely into the mixture within the lower part of the container so as to aerate the same.

As shown most clear in Figures 3 and 6, extending above the two containers between the two casings 29 is a water tank 75 connected through water supply pipes 76 to each of the pipes 73, the connection in each case embodying water supply valves 77, 78 associated one with each container 11, 12 respectively so that predetermined quantities of water can be fed to either or both containers as desired, the water passing through the interior of each shaft 14 to the bottom of each container in like manner to the aeration air aforesaid.

By feeding water to the interior of each container in this way the annular air passage provided within each hollow shaft 14 is kept free from any depositions of solid matter so as to provide a clear passage for the aeration air and the flow of the water ensures also that in the event of it being necessary to provide a bearing between the lower end of each shaft 14 and the pump driving shaft 32, such bearing will be kept free from clogging by the solid constituents of the composition which is to be sprayed.

In operation where it is desired to coat a wall or other surface with a plaster having a cement and sand base, the 4-way and 3-way valves would be operated so as to connect each container 11, 12 to a mixing circuit, one of these circuits being formed by the hose 63 and the other by the hose 55, i.e. the two valves may be disposed in the position indicated in Figure 6.

The engine 24 is now started so as to simultaneously drive both the agitator and circulating pump associated with each container 11, 12 so as to drive the agitator or paddles within each container. The two water supply valves 77, 78 would then be opened so as to fill each container with water to approximately one-quarter of its depth. The desired quantity of cement would then be poured into each container 11, 12 through the open mouth thereof, for example, with the water already in each container to fill the same approximately to one-third of its depth.

The two aeration valves 71, 72 are now opened so as to admit air under pressure to the bottom of each container such air passing upwardly through the contents of the container so as to aerate the same simultaneously with the mixing of the water and cement together by the continued rotation of each agitator or set of paddles. During this operation minute bubbles of air become attached to the cement particles so as to maintain the cement in suspension in the water.

The sand is now added in quantities such that each container is now filled to a depth of approximately two-thirds its capacity.

During the addition of the various constituents to each container as above described these as added would be circulated by the associate pump around the two mixing circuits aforesaid, so that a relatively short time after the addition of the sand had been completed the constitutents would be thoroughly mixed in each container and would be ready for spraying on to the wall or other surface to be coated.

Accordingly the 3-way valve 51 is now opened so as to place its inlet port 50 in communication with the feeding circuit hose 54 so that with the 4-way valve in the position depicted in Figure 6 the mixture from the container 11 is now circulated past the spray gun from which a proportion of the mixture is discharged, as in my prior specifications aforesaid; the remainder of the mixture from the container 11 circulating around its associated feeding circuit until the contents of container 11 are exhausted.

Simultaneously the agitator and pump associated with the container 12 have been maintaining the constituents thereof properly mixed so that immediately the contents of the container 11 are exhausted, the 4-way valve 43 can be turned so as to place the container 12 in the feeding circuit; the end 60 of the return hose 59 of which is now directed into the mouth of the container 12. The container 11 is now recharged, the end 64 of the mixing circuit directed into the mouth of the container 11, so that the mixture therein is fully mixed while the material within the container 12 is being fed to the spray gun and is thus itself ready for supply to the spray gun as soon as the contents of the container 12 have been exhausted.

Thus the apparatus ensures that the spray gun may be fed continuously with a properly mixed spraying mixture for as long as it is desired to carry out the coating operation, which can be continued for an indefinitely long period, and there is no danger of the hose or other pipes in the feeding circuit becoming clogged in consequence of temporary cessations in the spraying of the composition, while fresh mixture of the composition is made.

What I claim then is:

1. A process for coating surfaces with liquid compositions containing solid matter in suspension, said process comprising the steps of mixing together successive batches of the composition to be coated, circulating each batch in turn around a closed circuit constituting a feeding circuit, discharging directly from said feeding circuit on to the surface to be coated a proportion only of said circulating batch while continuing to circulate the remainder of said batch around said feeding circuit, and simultaneously with the circulation of one batch around said feeding circuit and the discharge of a proportion of said batch therefrom, mixing the next successive batch and circulating the same continuously around a further circuit constituting a mixing circuit, so as to maintain the solid constituents of such batch mixture in suspension in the liquid vehicle until the same is required to be supplied to said feeding circuit on the utilisation of the batch, or a predetermined proportion thereof, which has previously been mixed.

2. Apparatus for coating surfaces with liquid compositions containing solid matter in suspension, said apparatus comprising a pair of mixing containers for the composition to be applied, means for effecting mixture of the constituents of said composition within each of said containers, fluid circulating means operably connected to each of said containers and so arranged as to be capable of circulating the composition around either of two mixing circuits of which the associated container forms a part, a feeding circuit, means for discharging from said feeding circuit directly on to the surface to be coated a proportion only of said composition circulating around said feeding circuit, said discharge means being adapted to permit of the remainder of said composition continuing to circulate around said feeding circuit during the discharge of composition therefrom, and means for effecting circulation of the mixture from one or the other of said two containers continuously around said feeding circuit, the arrangement being such that the fully mixed composition from one container can be circulated around the feeding circuit and a proportion thereof discharged therefrom, while simultaneously, further composition can be mixed in the other container and circulated continuously around the associated mixing circuit, so as to maintain the solid constituents thereof in suspension in the liquid vehicle right up to the time at which it is required to supply the same to the feeding circuit.

3. Apparatus for coating surfaces with liquid compositions containing solid matter in suspension, said apparatus comprising a pair of fluid circulating pumps associated one with each container, means for driving each of said pumps, each of said pumps being adapted to receive fluid from its associated container and to deliver same under pressure, valve means for receiving said delivered fluid said valve means being adapted to permit of the composition being circulated around either of two mixing circuits of which the associated container and pump forms a part, a feeding circuit, means for discharging from said feeding circuit directly on to the surface to be coated a proportion only of said composition circulating around said feeding circuit, said discharge means being adapted to permit of the remainder of said composition continuing to circulate around said feeding circuit during the discharge of composition therefrom, and valve means adapted to permit of circulation of the mixture sent by one or the other of said pumps from its associated container continuously around said feeding circuit, simultaneously with the circulation by the other pump of composition from its associated container around one of said mixing circuits.

4. Apparatus for coating surfaces with liquid compositions containing solid matter in suspension, said apparatus comprising a pair of mixing containers for the composition to be applied, a pair of fluid circulating pumps associated one with each container, means for driving each of said pumps, each of said pumps being adapted to receive fluid from its associated container and to deliver same under pressure, valve means for receiving said delivered fluid said valve means being adapted to permit of the composition being circulated around either of two mixing circuits of which the associated container and pump forms a part, a feeding circuit, means for discharging composition from said feeding circuit directly on to the surface to be coated and valve means adapted to permit of circulation of the mixture sent by one or the other of said pumps from its associated container continuously around said feeding circuit, simultaneously with the circulation by the other pump of composition from its associated container around one of said mixing circuits, said valve means comprising a 4-way valve with the outlets from the two pumps connected to two of the four valve ports of such 4-way valve, the remaining two ports of said 4-way valve being connected one to a return pipe forming part of the mixing circuit and adapted to return mixture to one or the other of two containers, the other of said two remaining ports of said 4-way valve being connected to the inlet side of the feeding circuit, the said valve means comprising also a 3-way valve through which the said 4-way valve is connected to said feeding circuit, said 4-way valve being connected to one of the three ports of said 3-way valve, the remaining two ports of said 3-way valve being connected one to the feeding circuit and the other to a pipe forming part of a second mixing circuit and adapted to return mixture to one or the other of the two containers.

5. Apparatus for coating surfaces with liquid compositions containing solid matter in suspension, said apparatus comprising a pair of mixing containers for the composition to be applied, means for effecting mixture of the constituents of said composition within each of said containers, fluid circulating means operably connected to each of said containers and so arranged as to be capable of circulating the composition around either of two mixing circuits of which the associated container forms a part, a feeding circuit, means for discharging from said feeding circuit directly on to the surface to be coated a proportion only of said composition circulating around said feeding circuit, said discharge means being adapted to permit of the remainder of said composition continuing to circulate around said feeding circuit during the discharge of composition therefrom, and means for effecting circulation of the mixture from one or the other of said two containers continuously around said feeding circuit, the arrangement being such that the fully mixed composition from one container can be circulated around the feeding circuit and a proportion thereof discharged therefrom, while simultaneously, further composition can be mixed in the other container and circulated continuously around the associated mixing circuit, so as to maintain the solid constituents thereof in suspension in the liquid vehicle right up to the time at which it is required to supply the same to the feeding circuit, said fluid circulating means comprising a pair of pumps associated one with each container and valve means so arranged as to permit of the mixture in both containers being circulated continuously in mixing circuits associated one with each container and to permit of mixture from one of said containers being alternatively circulated continuously around the feeding circuit while the mixture from the other container is circulated continuously around its associated mixing circuit.

6. Apparatus for coating surfaces with liquid compositions containing solid matter in suspension, said apparatus comprising a pair of fluid circulating pumps associated one with each container, means for driving each of said pumps, each of said pumps being adapted to receive fluid from its associated container and to deliver same under pressure, valve means for receiving said delivered fluid said valve means being adapted to permit of the composition being circulated around either of two mixing circuits of which the associated container and pump forms a part, a feeding circuit, means for discharging composition from said feeding circuit directly on to the surface to be coated and valve means adapted to permit of circulation of the mixture sent by one or the other of said pumps from its associated container continuously around said feeding circuit, simultaneously with the circulation by the other pump of composition from its associated container around one of said mixing circuits, and said valve means comprising a 4-way valve with the outlets from the two pumps connected to two of the four valve ports of such 4-way valve, the remaining two ports of said 4-way valve being connected one to a return pipe forming part of the mixing circuit and adapted to return mixture to one or the other of two containers, the other of said two remaining ports of said 4-way valve being connected to the inlet side of the feeding circuit, and each mixing circuit return pipe is formed by a flexible hose the end of each hose remote from its associated valve being adapted to be inserted in one or the other of the two containers as required.

7. Apparatus for coating surfaces with liquid compositions containing solid matter in suspension, said apparatus comprising a pair of mixing containers for the composition to be applied, means for effecting mixture of the constituents of said composition within each of said containers, fluid circulating means operably connected to each of said containers and so arranged as to be capable of circulating the composition around either of two mixing circuits of which the associated container forms a part, a feeding circuit, means for discharging composition from said feeding circuit directly on to the surface to be coated and means for effecting circulation of the mixture from one or the other of said two containers continuously around said feeding circuit, the arrangement being such that the fully mixed composition from one container can be circulated around the feeding circuit and discharged therefrom, while simultaneously, further composition can be mixed in the other container and circulated continuously around the associated mixing circuit, so as to maintain the solid constituents thereof in suspension in the liquid vehicle right up to the time at which it is required to supply the same to the feeding circuit, said means for effecting mixture of the constituents of said composition within each of said containers comprising an agitator disposed within each container, each agitator being mounted upon a shaft supported for rotation within its associated container about a substantially vertical axis each shaft being hollow with its lower end terminating a short distance above the bottom of the associated container, and means being provided for feeding air under pressure into the interior of said shaft so as to be discharged therefrom at the bottom of the container for the purpose of aerating the constituents of the mixture.

8. Apparatus for coating surfaces with liquid compositions containing solid matter in suspension, said apparatus comprising a pair of mixing containers for the composition to be applied, means for effecting mixture of the constituents of said composition within each of said containers, fluid circulating means operably connected to each of said containers and so arranged as to be capable of circulating the composition around either of two mixing circuits of which the associated container forms a part, a feeding circuit, means for discharging composition from said feeding circuit directly on to the surface to be coated and means for effecting circulation of the mixture from one or the other of said two containers continuously around said feeding circuit, the arrangement being such that the fully mixed composition from one container can be circulated around the feeding circuit and discharged therefrom, while simultaneously, further composition can be mixed in the other container and circulated continuously around the associated mixing circuit, so as to maintain the solid constituents thereof in suspension in the liquid vehicle right up to the time at which it is required to supply the same to the feeding circuit, said fluid circulating means comprising a pair of pumps associated one with each container and valve means so arranged as to permit of the mixture in one container being circulated continuously in a mixing circuit associated with such container while permitting of mixture from the other container being circulated continuously around the feeding circuit, each said pumps being disposed adjacent the base of its associated container, each pump comprising a rotor mounted for rotation about a vertical axis and driven by a pump driving shaft extending within an outer hollow agitator driving shaft which agitator driving shaft serves to drive an agitator for effecting mixture of the constituents of the composition within each container.

9. Apparatus according to claim 8 wherein each pump rotor is rotatable within a hollow pump stator one end of which communicates directly with the interior of the container by means of an opening in the base thereof through which passes the driving means of said pump, the opposite end of the pump stator communicating with a pump outlet or delivery port.

ALBERT HENRY HAWES.

References Cited in the file of this patent

UNITED STATES PATENTS

| Number | Name | Date |
| --- | --- | --- |
| 1,215,560 | Leak | Feb. 13, 1917 |
| 1,670,677 | Brown | May 22, 1928 |
| 2,316,705 | Morgan et al. | Apr. 13, 1943 |
| 2,391,858 | Auer | Jan. 1, 1946 |
| 2,552,763 | Baumann | May 15, 1951 |